A. J. HOYT.
Brick-Machine.

No. 163,494.

5 Sheets--Sheet 1.

Patented May 18, 1875.

Witnesses
W. E. Kavanagh
R. D. O. Smith

Inventor.
Andrew J. Hoyt
BY HIS ATTORNEY.
Wm. Frank Browne.

THE GRAPHIC CO. PHOTO-LITH. 39 & 41 PARK PLACE, N.Y.

A. J. HOYT.
Brick-Machine.
No. 163,494.
5 Sheets--Sheet 2.
Patented May 18, 1875.
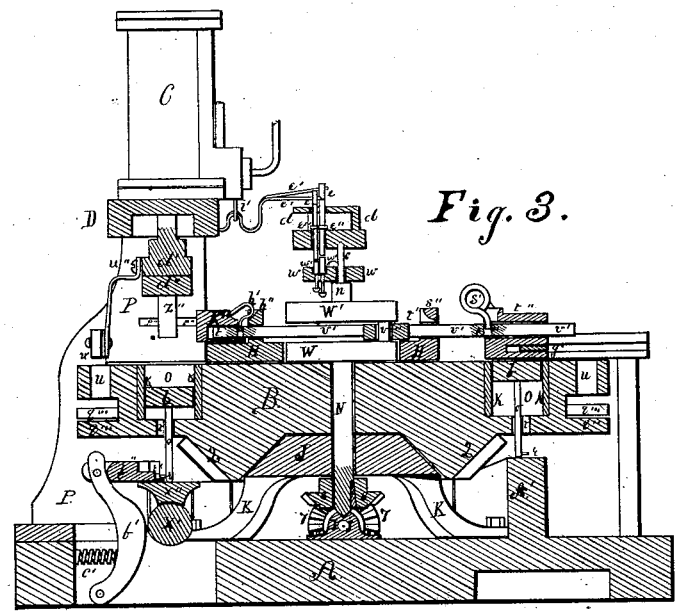
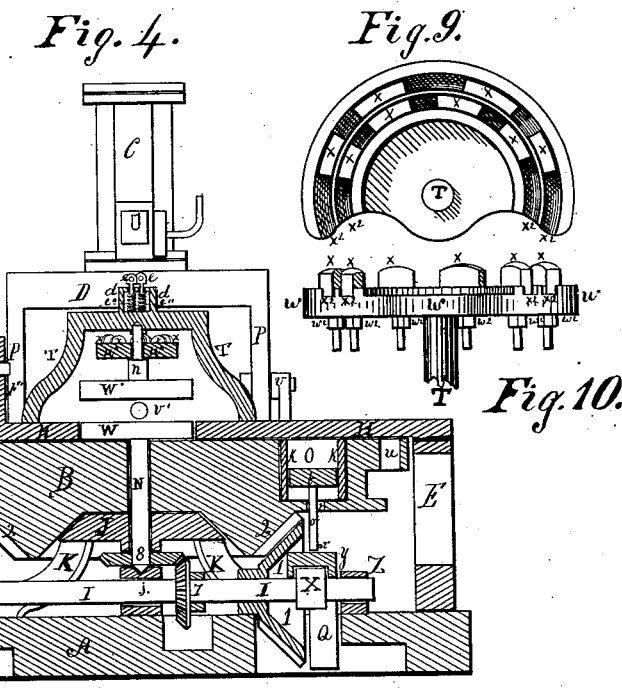
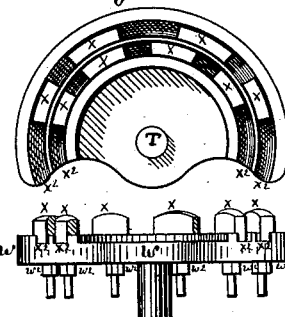

A. J. HOYT.
Brick-Machine.
No. 163,494.
5 Sheets--Sheet 3.
Patented May 18, 1875.
Fig. 5.
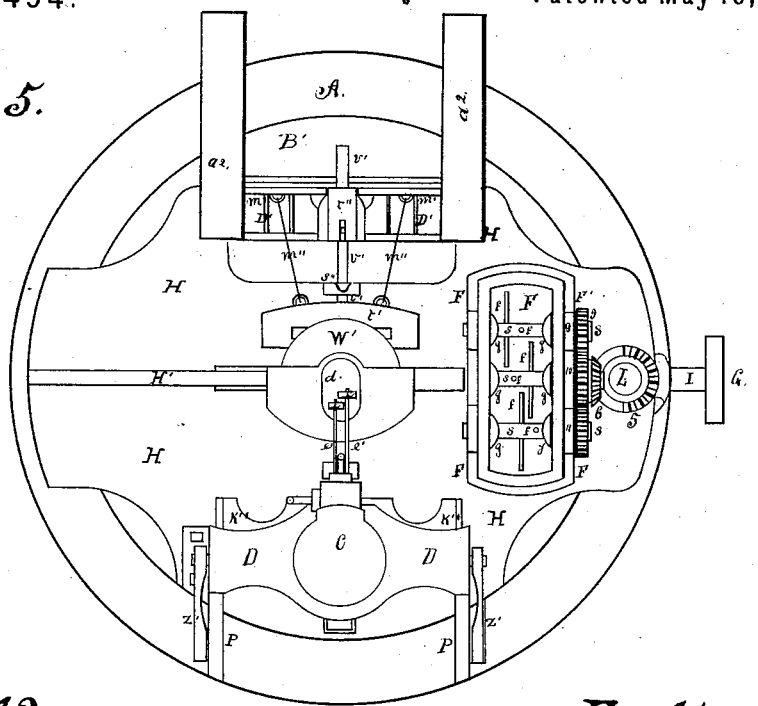
Fig. 13.
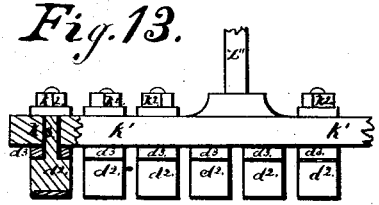
Fig. 14.
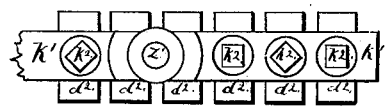
Fig. 15.
Fig. 6.
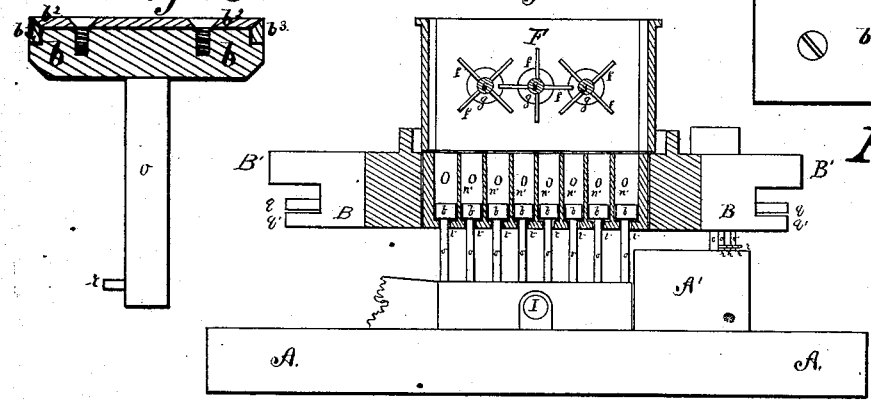
Fig. 16.
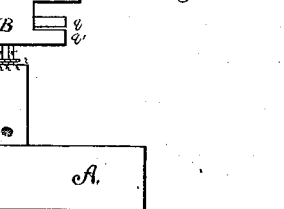
Witnesses.
W. E. Kennaugh
R. D. Smith
Inventor
Andrew J. Hoyt.
BY HIS ATTORNEY.
Wm Frank Browne.
THE GRAPHIC CO. PHOTO-LITH. 39 & 41 PARK PLACE, N.Y.

5 Sheets--Sheet 4.

A. J. HOYT.
Brick-Machine.

No. 163,494. Patented May 18, 1875.

Witnesses
W. E. Kennaugh
R. D. O. Smith

Inventor.
Andrew J. Hoyt
BY HIS ATTORNEY
Wm Frank Browne.

THE GRAPHIC CO. PHOTO-LITH. 39 & 41 PARK PLACE, N.Y.

5 Sheets--Sheet 5.

A. J. HOYT.
Brick-Machine.

No. 163,494. Patented May 18, 1875.

Witnesses.

Inventor.
Andrew J. Hoyt.
BY HIS ATTORNEY.
Wm. Frank Browne.

UNITED STATES PATENT OFFICE.

ANDREW J. HOYT, OF PHILADELPHIA, PENNSYLVANIA.

IMPROVEMENT IN BRICK-MACHINES.

Specification forming part of Letters Patent No. 163,494, dated May 18, 1875; application filed November 20, 1874.

*To all whom it may concern:*

Be it known that I, ANDREW J. HOYT, of the city and county of Philadelphia, and State of Pennsylvania, have made some new and useful Improvements in Brick-Making Machines; and I do hereby declare that the following is an exact description thereof, being fully illustrated in the accompanying drawings.

The invention herein set forth is an improvement upon the former inventions granted to me, and bearing date June 2, 1874, numbered, respectively, 151,491 and 151,492.

Figure 1:
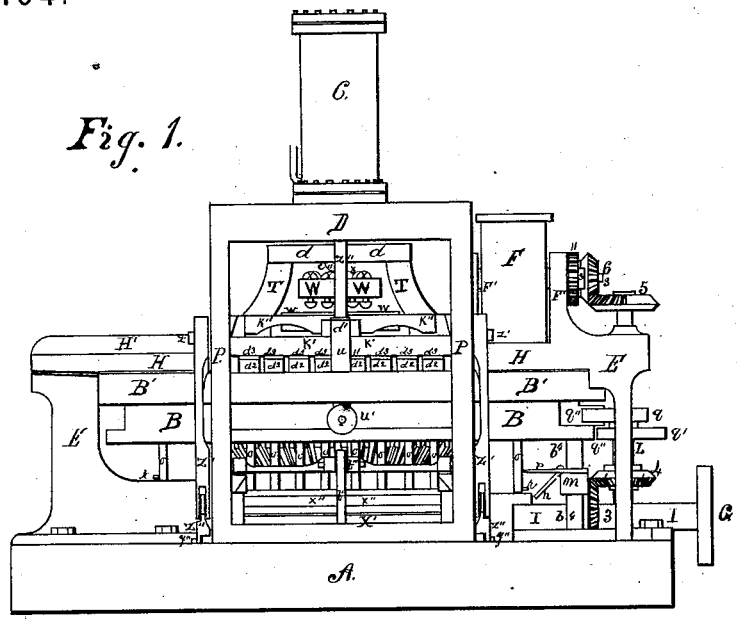
Figure 2:
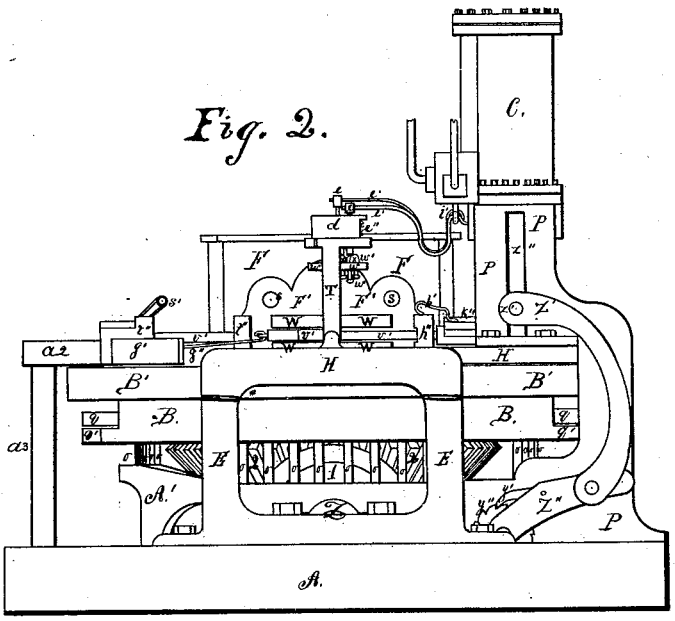
Figure 17:
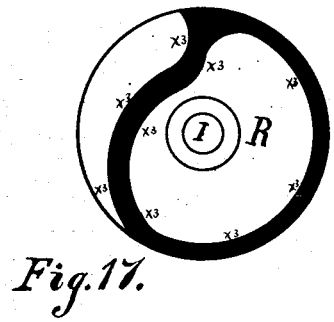
Figure 18:
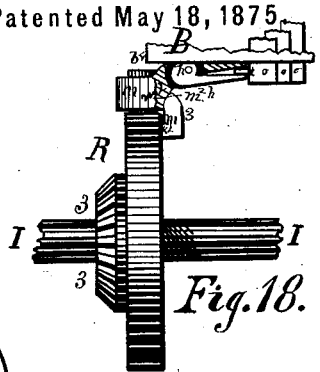
Figure 7:
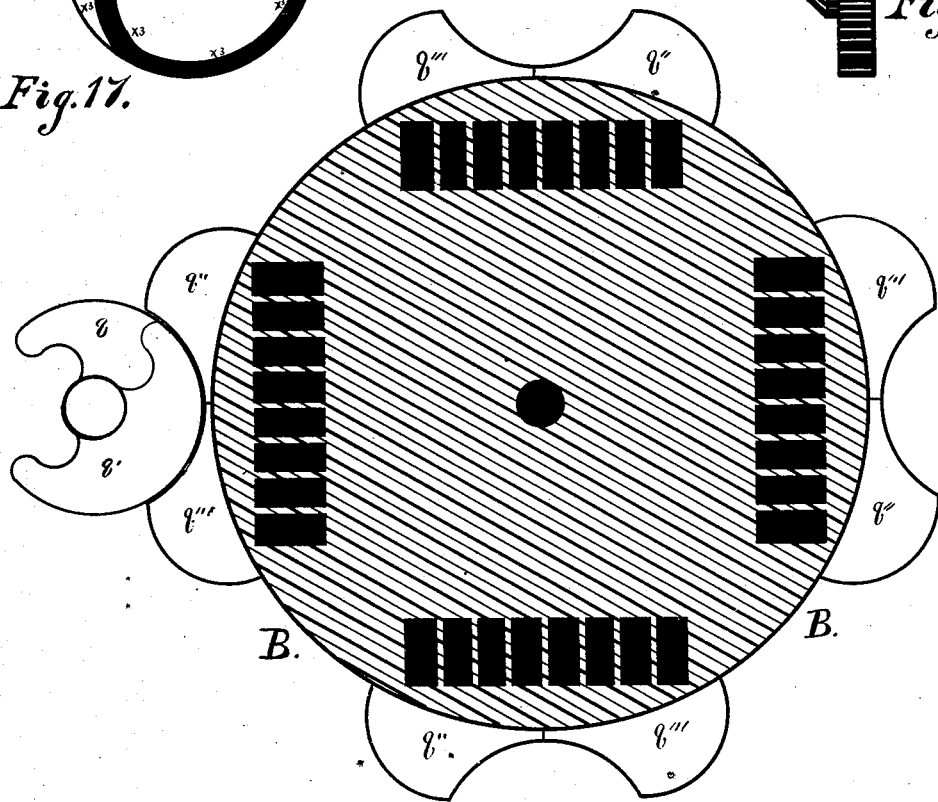
Figure 8:
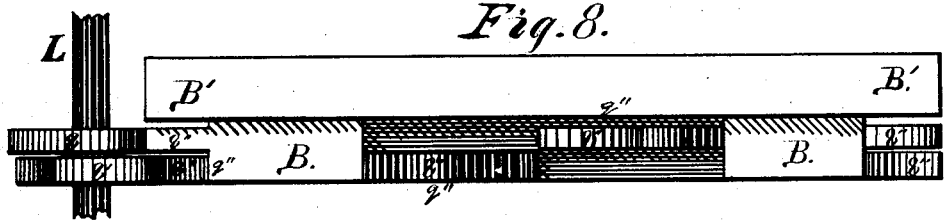

Figure 1 is a view of a front elevation of a brick-machine. Fig. 2 is a side elevation of the same. Fig. 3 is a vertical section cutting the machine at right angles to the front elevation shown in Fig. 1. Fig. 4 represents a vertical section cutting the machine at right angles to the side elevation, Fig. 2. Fig. 5 is a top plan of the machine. Fig. 6 is a detached sectional view cutting through the feed-hopper and a set of molds. Fig. 7 represents a sectional view of the mold-table. Fig. 8 is an edge view of the mold-table detached from the machine. Fig. 9 is a top plan of an automatic device for operating the valve or cut-off to a steam-cylinder. Fig. 10 is a side view of Fig. 9; Fig. 11, detail views. Fig. 12 is an enlarged broken cross-section of Fig. 9. Fig. 13 is a broken sectional view of a cross-head attached to a piston-rod. Fig. 14 is a plan of the same. Fig. 15 is a section of a follower to one of the brick-molds. Fig. 16 is a plan of the same; Fig. 17, view of a cam. Fig. 18 is a view of the same, showing the working parts connected therewith.

Like letters designate corresponding parts in all of the figures.

In Fig. 1, A is a foundation or base, upon which the entire machine rests, and is secured thereto by bolts or their equivalents. E E are standards secured to the base A, and support the table or platform H, on which many of the essential parts of the machine rest. H' is a rib cast to the table to give it additional strength. B B B' B' represent the revolving mold-table. $q''$ $q'''$ are projections secured to the mold-table, for a purpose hereinafter mentioned. P P are two standards secured to the base A, and supporting the cross-bar D. C is a steam-cylinder mounted upon the cross-bar D, and securely fastened thereto. $z''$ represents a piston-rod, connecting the die-head $d''$ $d''$ with the steam-cylinder C. $d^2$ $d^2$ $d^2$ are dies secured to the die-head $d''$ $d''$. $d^3$ $d^3$ $d^3$ is a rubber cushion secured between the die-head $d''$ $d''$ and the dies $d^2$ $d^2$ $d^2$. $o$ $o$ $o$ are stems, rods, or posts connected with and supporting the followers within the molds where the brick is to be formed. $a'$, $u$, and $u'$ is an arrangement for holding the mold-table in position while the clay within the molds is being compacted or compressed by the force of the steam above. $x''$ is an anvil or its equivalent, on which the posts $o$ $o$ $o$ stand while the clay within the molds is being beaten or compressed. $Z'$ $Z'$ are connecting-bars connecting the die-head $d''$ $d''$ with the ratchet-levers $Z''$ $Z''$. T T are standards supporting a cross-bar, $d$ $d$. $x$ $x$ $x$ are cams inserted into a horizontal circular disk for automatically operating the steam cut-off. $e''$ is a reverse cam communicating with one of the levers, operating one of the cut-offs. F is a hopper to receive the clay just before being molded. $F''$ $F'$ are standards inclosing the hopper F on two of its sides; also, the standards support three shafts, $s$ $s$ $s$, which pass through the hopper F. I I is the main driving-shaft, which communicates motion to all the moving parts of the machine. G is the main driving-pulley, through which motive power is imparted or conveyed from an engine or its equivalent. 3 is a beveled toothed wheel on the shaft I, communicating motion to the perpendicular shaft L by means of the horizontal bevel-wheel 4. 5 is an intermittent bevel-wheel secured to the shaft L. This intermittent wheel gives motion to the bevel-pinion 6. This wheel transmits motion to cog-wheel 10, and 10 to 9 and 11, thereby giving an intermittent motion to the three shafts $s$ $s$ $s$. $q$ $q'$ are two semicircular wheels secured to the shaft L, to be employed in connection with the corresponding concave projections $q''$ $q'''$ on the lower portion of the mold-table B B. $m$, $p$, and $h$ are automatic devices for bringing the follower-posts $o$ $o$ $o$ to that section of the track directly beneath the hopper. By this device the posts $o$ $o$ $o$ are all brought down at the same time. Fig. 2 is a side elevation, showing parts not visible in Fig. 1. Z represents the journal-box supporting the end of the main driving-shaft I I. (Shown in Fig. 1.) 1 is a beveled toothed wheel secured to the shaft I, and working in the beveled wheel 2. This wheel 2 is cast or otherwise secured on the under side of the mold-table B B'.

A' is a section of the track on which stems or posts $o\ o\ o\ o$ slide; $y''$, a ratchet-wheel, and $y'$ a pawl working therein. $a^3$ is a standard supporting one end of the way or track $a^2$. $g'$ is an automatic traveling and swinging device for removing the brick from the machine as they rise out of the mold-table. $s'\ t''\ g''\ v'$ are parts connected with this brick-removing device, which will be explained hereafter. $e\ e'$ are levers operating the cut-offs, and controlling the steam within the cylinder C.

In Fig. 3, A A' represent a section of the base and track. K K are standards supporting the beveled journal J, on which the mold-table rests and revolves; N, a vertical shaft, supported and revolving in a conical seat, $j$, the motion being obtained by bevel-wheels 7 and 8. This shaft N passes through the center of the step or journal and the mold-table B, where it terminates in a horizontal disk, W. W' is another disk directly above, and of the same size as, disk W, and is connected thereto by a pin or short shaft, $v''$, situated near the periphery of the two disks. O O are molds, in which the bricks are formed; $b$, the followers, fitting tightly therein, and supported on the stem or post $o$. These posts rest upon the track A'. X' is a cam-shaft revolving upon two end journals. $x''$ is a movable section of the track A'. This section of the track rests upon the cam-shaft X', and rises and falls as the cam revolves. This section of track is called the "anvil," as it sustains the blows given in compacting the clay directly above. $b'$ is a lever, jointed to a section of track, $b''$, which moves back and forth horizontally, its movement being obtained by the spring $c'$ forcing the lever $b'$ against the cam-roller X'.

In Fig. 4, A represents the base of the machine; I I, the main driving-shaft. X is a cam-roll, which works into and under the pressure-bar $y$. Q is a guide to one end of the bar. This cam-roll and pressure-bar is for giving additional pressure to the bricks. 1 is a sectional view of the intermittent beveled driving-wheel, meshing into the bevel-wheel 2. By this means the mold-table is made to revolve. F is a sectional view of the hopper, showing the mixer or rods passing through shafts $s\ s\ s'$. $i\ i$ represent a slot in the sides of the hopper. $a\ a^1$ represent projections on the shaft $s$. These projections are somewhat longer than the width of the slot, for the purpose of giving the hopper a reciprocating motion. $g\ g'$ are two flanges on the shaft S within the hopper, and, adjacent to the two slots $i\ i$, are of sufficient diameter to cover them. These flanges are to keep the clay from entering the slot $i$, which it would do, and interfere with the working of the lug or projections $a\ a^1$.

The top plan of the machine is shown in Fig. 5. A represents a circular base, and B' a circular revolving mold-table. H is supported on columns or their equivalents. $a^2\ a^2$ are two grooved guideways, used to guide and support the two ends of the automatic device, for removing the brick when they are brought to the surface of the mold-table. $m\ m',\ m'',\ m''',\ v',\ t'$, and W' are necessary parts of this automatic device. F is a top plan of the hopper, showing the three shafts $s\ s\ s$, with their stirring-rods $f\ f\ f$. It also shows the device for giving an intermittent motion to the mixers $s\ f\ s\ f\ s\ f$ and the hopper F. The motion is caused by the semicircular beveled gear-wheel, 5, communicating one-half of its motion to gear-wheel 6. A sectional view of the hopper and mold-compartments are shown in Fig. 6. O O O represent the molds to be filled with clay from the hopper above; $b\ b\ b$, the followers; B B', the mold-table.

Fig. 7 is a horizontal section of the mold-table B, showing four sets of molds, with eight molds in a set. $q''\ q'''$ are lugs or projections cast or otherwise secured to the mold-table. Their working faces are concave, and work in conjunction with a semicircular segment of a wheel, $q\ q'$. This wheel or segment is secured to the vertical shaft L. This device is used to hold the mold-table in position while the clay within the molds is being compacted by the steam-dies; also, the re-pressing takes place at the same time on the set of brick which has immediately preceded those that are being compacted. At the same time the set of brick in advance of those which are undergoing re-pressure, are being removed from the machine by the automatic removing device, while the empty molds which have preceded this quarter movement are being filled, ready for the compacting process on its next quarter movement, which takes place when segment $q'$ leaves $q''$. B B' in Fig. 8 is a side view of the mold-table and the projections $q''\ q'''$, with one set in connection with the semicircular segments $q\ q'$.

Fig. 9 is a view of segmental disk $w$, with two concentric grooves, $x^2\ x^2$, therein. Within these grooves there are fitted a series of cam-teeth. These teeth are adjustable, and are held securely to their places by bolts and nuts thereon, as shown in Fig. 10. Each tooth is constructed with a T-groove within its base, or that part that rests on the disk $w$. This groove runs lengthwise and concentric with the tooth, and with the top of the T within the body of the tooth, as shown in Fig. 12, which is an enlarged sectional view of two cam-teeth, $x\ x$, and a portion of the disk $w$. There are shown two bolts, with their heads fitting within the T-grooves in the cam-teeth $x\ x$. These bolts pass through holes in the disk $w$, and are made to hold the cam-teeth firmly in their respective positions by turning the ing the surface of the brick to a uniform surface preparatory to their compression beneath the pressure-plate and bar H H'. This final compression produces a finely-finished pressed brick, suitable for building-fronts and other fine and artistic work. But, whenever a less costly brick is required, such as is used in back walls, pavements, and sewers, the re-pressing operation may be dispensed with, which can or may be done by raising the pressure-plates H from the surface of the mold-table, thus allowing the brick to pass uninterruptedly on to the point of removal.

Figure 20:
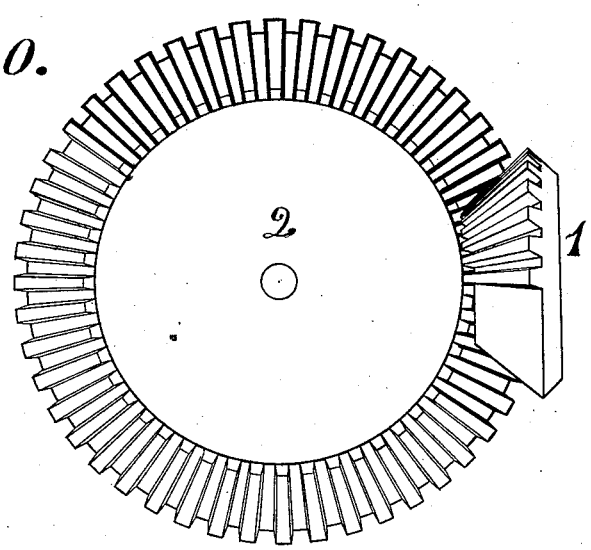

Fig. 20 represents the bevel-wheel 2 and pinion 1. This pinion communicates an intermittent motion to the mold-table. To produce this motion the pinion has but a portion of its surface provided with teeth, and the remainder of its surface in blank.

Figure 21:
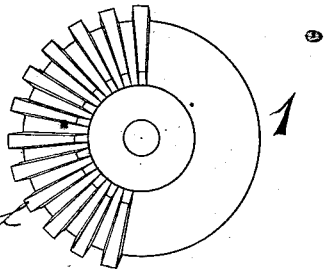

To ascertain the number of teeth required on the pinion, the following rule may be adopted: First find how many movements are required in one revolution of the mold-table, and then divide the number of cogs by the number of movements; the quotient will be the number of cogs the pinion will require. Figs. 20 and 21 are laid out according to the above rule. This machine is designed to manufacture brick from untempered clay, or just as the clay is taken from the bed or bank. The clay is first pressed between heavy iron rollers set near together, so that the clay may be reduced to a certain degree of fineness; also to crush what small stones the clay may contain. As the clay leaves the rolls it falls into buckets secured to an endless revolving-belt. Said buckets are carried upward and pass over a pulley, and deposit their load of clay into the hopper F, and from that place into the molds, where, after various manipulations, it is formed into brick.

The following description will describe the operation of the machine and the various parts thereof. The base of the machine A is made of any desirable form, and of such material as is best suited for its purposes. The most desirable form, however, is circular, and the material best adapted to the purpose is cast-iron. This base is provided with necessary openings for several of the working parts of the machine. In a central line across the top of this base A the main driving-shaft I is located, where it revolves upon its journals in boxes tightly secured to the base or bed A. Near the circumference of this machine necessary posts or standards are erected. These posts may be cast with the base itself, or firmly bolted thereto. A platform, H, covering the greater part of the mold-table, is secured to the top of the standards by bolts or their equivalents. The posts must be of sufficient length to allow a free movement to the mold-table under the platform. The standards F' F'' are secured to the platform, and are provided with proper bearings for the journals of the shafts $s\ s\ s$ to revolve in. Between these standards the hopper is located. Two standards, T T, are secured to the top of the platform, and connected at their tops with a cross-bar. This cross-bar rests centrally over the center of the machine, and has a central pivot-point in its under side, which guides the motion of the central vertical shaft N. $d\ d$ is a bracket secured to the top of the cross-bar, for the purpose of forming an additional bearing, and inclosing two spiral springs surrounding two vertical rods, which are operated by cam-teeth within a disk below. The upper ends of these vertical rods are provided with a semicircular enlargement, $e\ e$. Through this enlargement the valve-levers $e'\ e'$ project, while their other ends are fixed in the cross-bar D. Near this point the valve-rods connect with the levers $e'\ e'$, thereby causing the steam-valves to open and close at intervals of time corresponding to the required set or position of the cam-teeth within the segmental disk $w$. This required setting of the cam-teeth determines the number of blows to be given to each set of brick, and also determines the interval of time intervening between each successive blow.

One set of cam-teeth admits the steam above the piston, while the other set admits it below; so between the two sets of cam-teeth the piston is made to reciprocate back and forth at pleasure; but as it is not necessary that this movement should take place only at intervals corresponding to the movements of the molder, the segmental disk is provided with only a sufficient number of teeth to correspond with that movement; consequently the segmental disk $w$, with the vertical shaft N, must revolve around four times to the molder once. As there are but four teeth in each of the concentric grooves, there can be but four blows given to each set of teeth; therefore, if more blows are needed, the addition of more teeth will give them.

If it is found necessary to vary the pressure of the blows, the variation can be accomplished by a variable set of cam-teeth, or by a set that may be adjusted according to the requirements.

The first blow given should necessarily be the lightest, as at that period the clay lies lightly within the molds; consequently the interstices between the particles of clay are filled with air, and a heavy blow given at first has a tendency to compress the air within, at or near the center of the brick, and at the same time the heavy blow compacts the clay which comes in contact with the die and follower so closely that it is rendered almost air-tight, thereby keeping the compressed air within the brick, which afterward proves to be a great detriment to its serviceability. To remedy this evil, cam-teeth of different lengths are employed, the shorter teeth giving the lightest blows, while each succeeding tooth increases the force of the blow, according to their greater and increasing length. As the cam-teeth control the valves, it will be observed that the longer the teeth are the nuts $w^2 w^2$ against the disk $w$, thereby bringing the bolt-heads $w^3 w^3$ tightly against the shoulder formed by the T-groove within the cam-teeth.

When a tooth is to be adjusted, turn its attendant nut back until it becomes loosened, and then move the tooth to the point required, after which turn the nut tightly against the disk, thus firmly securing the tooth in its required position. Figs. 13 and 14 are views of the steam die-compactors, Fig. 13 being a side elevation of the same. $d^2 d^2 d^2$ are dies that fit the molds. $d^3 d^3 d^3$ are rubber cushions, inserted between the die and the die-head. $K^1 K^3$ is a section of one of the dies $d^2$, showing a stem or bolt projecting therefrom, passing through and holding to its place the rubber cushion, and also through the head $K^1$, all being kept to their places by the nut $K^2$, as seen in the figure. In Fig. 14 it will be seen that the dies $d^2 d^2$ extend lengthwise across the die-head $K^1$. Fig. 15 is a sectional view of one of the followers $b$, with the stem $o$ projecting therefrom. $b^2$ is a piece of steel secured to the upper side of the follower. $b^3$ is a steel band or its equivalent, secured to the upper edge of the follower, and jointed to $b^2$ with a beveled joint, or otherwise, thus forming a steel and durable wearing surface, which cannot be otherwise obtained with less simplicity of construction. This follower can be made of chilled iron, and afterward finished to the required conditions. This would undoubtedly be found to be more durable than the one above mentioned; also, the sides of the molds and the dies can be made of chilled metal and finished in a manner to suit the conditions required. Fig. 17 is a view of a cam, R, I being the center on which it revolves. $x^3 x^3 x^3$ is a groove, around and through which a pin or its equivalent passes, or is made to rise and fall perpendicularly, as circumstances require. Fig. 18 is an elevation of the cam R, secured to the shaft I. $b^4$ is the end of a post or standard, passing through and projecting above the hub $m$. This hub rises and falls upon this standard. There is another hub and standard, not shown in this figure, but on the opposite side of the cam R, and is connected thereto by the part joining the hub $m$, shown in cross-section. $m^3$ is a projection from the cross-bar, terminating in a pin, $x^2$, which projects into the groove $x^3 x^3 x^3$. (Shown in Fig. 17.) $h$ in Fig. 18 is a section of the track $A^1$, and hinged to the bar $m^2$. This hinged section of the track is for the purpose of holding the followers up to the upper surface of the mold-table while passing under the hopper F. This movable section of the track $h$ corresponds with the track $A^1$ when in the position as shown in Figs. 18 and 4. While in this position the pin $x^2$ rests upon that part of the cam where its groove is at the same distance from the center, thereby giving the track-section $h$ a stationary position during one-quarter movement of the mold-table. During this movement the stems $o o o$ leave the stationary track $A^1$, and at the same instant the pins $r r$ in the lower end of the stems $o o$ catch onto the movable track $h$, and are supported there until the mold-table has completed its quarter movement, after which movement is obtained the pin suddenly falls into the groove toward the center of the cam, thereby allowing the sectional track $h$ to fall downward. This movement disengages the pins $r r r$ therefrom, and allows the followers to fall to the bottom of the molds, thus allowing all of the molds to be filled at the same time, and of uniform density. During the operation of filling the molds the mold-table is at rest. In the meanwhile the cam makes a half-revolution, thereby bringing the pin $x^2$ upon the elevated part of the cam, as shown in Figs. 8 and 4, thus bringing the sectional track into position, ready to receive the pins $r r r$, and support them during the next quarter-turn of the mold-table.

It will be observed that the cam R makes one revolution to every quarter movement of the mold-table; or, more strictly speaking, one-half of the revolution is made during the quarter movement of the mold-table, and the other half while the mold-table is at rest.

Figure 19:
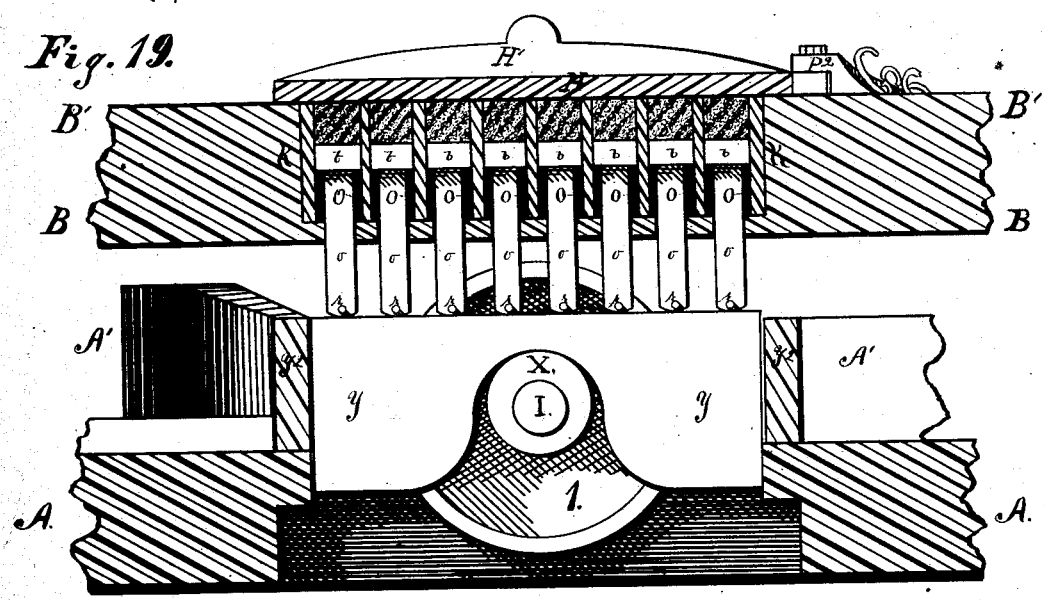

Fig. 19 is a vertical sectional view of that part of the machine where the brick within the mold which has been already compacted receives a compression or re-pressure, which makes them more solid, and also gives them a more finished surface than would be obtained if this device were not used.

A is the base of the machine. (Shown in broken section.) A′ is a section, or that portion of the track with an inclined plane. $y y$ is a movable sectional pressure-track. X is a cam-roll, working in an arched recess within the track, as shown. I is the end of the main driving-shaft, which supports the cam-roll. $y^2 y^2$ are guides, between which the sectional pressure-track rises and falls. 1 represents a beveled pinion, working, in connection with the beveled gear-wheel, underneath the mold-table. O O O represent the mold-compartments. $b b b$ are the followers working therein. The dotted section-lines above the follower $b$ represent the re-pressed brick in section. H and H′ represent a resisting-plate and rib or bar, against which the bricks are pressed by the cam-roll X below the sectional pressure-track $y y$. After the cam-roll revolves around, so as to relieve the pressure from the brick, the mold-table makes a quarter-movement to the left, thereby causing the stems to slide up the inclined plane on the track A′, thereby forcing the brick out of the molds, ready to be swept from the mold-table by the automatic removing device.

$p^2$ is a knife extending across a set of molds, so that each brick, as it passes under the knife, is relieved of all the surplus clay rising above the surface of the mold-table, thereby reducgreater will be the movement of the valve; consequently a greater volume of steam passes through the ports to the cylinder, thereby giving the required force, corresponding to the length of the cam-tooth operating the valve.

The movement of the segmental disk is derived from the main driving-shaft I I, and is communicated by means of the two bevel cog-wheels 7 and 8.

The mold-table B B' is supported on a journal or seat, J, which represents a segment of a cone. This segment rests upon four posts or standards, K K, which curve outward at their bases, where they are bolted to the bed or base A.

The molder turns upon the journal J by the intermittent bevel-pinion 1, which meshes into the cog-wheel 2.

The molder or mold-table is constructed of cast-iron or its equivalent. It is circular in form, with a flat surface for its top. This surface should be dressed either on a planer or lathe, so that it may thereafter revolve in a true plane. There are four recesses or molds within this mold-table, the form of which is that of a parallelogram, and the width thereof is equal to the length of a brick, while the length is equal to the thickness of eight bricks plus seven division-plates. These division-plates should be made of steel or chilled iron, and polished, after which they should be fitted into the mold-recesses in an exact and workmanlike manner, thereby forming eight compartments within one parallelogrammic recess. These molds are as near to the circumference of the mold-table as the strength of the metal will admit of. The depth of the molds is equal to the quantity of loose clay it takes to make a brick and the follower $b$. Each of these molds has a bottom, which is formed in the casting. Through these bottoms there are holes drilled, leading into each compartment. At the side of each hole there is a slot or small recess, $t$, for the purpose of letting out the clay, which may escape from the upper side of the follower to its under side. The stems or posts $o\ o\ o$ pass through the holes leading to each of the compartments, and connect with the followers therein. There is a small square mortise opposite the center of each set of molds, and passing through the segment formed by the sides of the molds and the circumference of the mold-table. A guide-pin or its equivalent falls into this mortise at every stroke of the piston. This guide should be made slightly tapering near its end, or at the point of entrance. Beyond this entering-point the guide should fit the mortise closely, so as to hold the mold-table rigidly while the dies are entering the molds, thus protecting the sides of the molds and dies from abrasion. As this is a vital point in the working of the machine, this or an equivalent device must be adopted.

The concave stops $q''\ q'''$ are cast or otherwise secured to the molder, and act in conjunction with the segments $q\ q'$. The conjunction takes place at every quarter-turn of the molder.

It will be observed by referring to Figs. 8 and 9 that the concave stops are in pairs, $q''\ q'''$. The upper plane of $q'''$ coinciding with the under plane of $q''$, a concave half-circle is formed by these two stops.

It will also be observed that the two segments $q\ q'$, Fig. 8, rest one above the other, the upper one, $q'$, being nearly a quarter of a circle in advance of $q$. This advance allows the segment $q'$ to strike or coincide with the concave stop $q'''$ just as $q$ comes in contact with $q''$. Now, while these two segments and concave stops coincide the mold-table is at rest, and at the same time that these stops and segments coincide with each other the intermittent bevel-pinion 1 has approached the blank space upon its surface, and ceased to act upon wheel 2. During this interim of time the segments have revolved around to a point where they can act upon the stops $q''\ q'''$. Now, while these segments have made this half-revolution the pinion 1 has traveled across the blank space, allowing its first tooth to act upon the wheel 2, thereby causing the mold-table to revolve another quarter of a circle, and again representing the action described above.

The cam roll or shaft X' (seen in Figs. 1 and 3) is secured in appropriate boxes within the sides of the frame P P. This cam-shaft is located directly under the sets of molds when brought into position to be acted upon by the steam die-compactors. It also runs parallel with the molds, so that the stems of the followers all rest upon the anvil $x''$, the anvil resting upon the cam-shaft, thus allowing it to rise and fall at each revolution the cam-shaft makes. The revolutions of the cam-shaft are caused and controlled by an automatic device, which consists of small ratchet-pinions $y''\ y''$, secured at and on the end of each journal of the cam-shaft, as seen in Figs. 1 and 2. Outside of these ratchet-pinions, and upon the same journals, are placed two movable levers, $Z''\ Z''$. The two pawls $y'\ y'$ turn upon pins in the levers $Z''\ Z''$, and fall into the ratchet-pinion, as shown in Fig. 2. The ends of the levers $Z''\ Z''$ connect with the levers $Z'\ Z'$. The ends of the levers $Z'\ Z'$ are connected to, and turn upon, the journal $z'$, which extends through the vertical slots $z''\ z''$, and are connected to (thereby rising and falling with) the die-head $d''\ d''$, thus elevating the levers $Z''\ Z''$ and pawls $y'\ y'$, and turning the ratchet-pinion and cam-roll the required distance, which may be determined by the length of the levers $Z''\ Z''$ between the cam-journals and the pins which connect these ends with the levers $Z''\ Z''$.

In order to vary the movement of the cam-roll X' as circumstances may require, the length of the levers $z''\ z''$ should be increased or diminished, which may be done by drilling a few holes in their ends, and afterward connecting the levers $Z''\ Z''$ to the ones required.

By this device, as above set forth, the anvil $x''$ is made to rise and fall with the stems and followers resting thereon. The cam-shaft and anvil, as shown in Fig. 3, is at its highest point, or at a point corresponding to the track beyond; but when the cam-shaft is at its lowest point, the top of the anvil is on a line with the track, ready to receive the follower-stems.

After the stems are all on the anvils the intermittent segmental pinion 1 ceases to act upon gear-wheel 2, allowing the mold-table to stop, which is held in position by the segmental disks $q$ $q'$ revolving into the concave counterparts $q''$ $q'''$.

Simultaneously with this operation the first tooth in disk $w$ comes in contact with the rod controlling the valve-lever, which lets the steam into the cylinder, thereby giving the first blow to the clay within the molds, after which the other valve-lever is acted upon by the first tooth in the adjacent concentric groove, allowing the steam to enter beneath the piston, and raises it preparatory for the next blow, which is caused by the next succeeding tooth in the outer concentric groove.

The levers $Z'$ $Z'$ $Z''$ $Z''$ rise and fall at each blow, carrying with them the two pawls, which engage with and turn the ratchet and cam-roll, thus elevating the anvil, which forces the stems and followers upward at each upstroke of the piston, thereby causing the clay to rise to the surface of the mold-table after each succeeding blow is given.

There is a counter-pawl on the under side of the ratchet-pinion, which holds the cam-roll in position while the upper pawl is returning for a new engagement. The advantage obtained by this continued raising of the clay at each stroke of the die-head is this: the clay becomes loosened around the walls of the molds, and allows the air a better chance to escape. Were the clay to remain where the dies left it at each stroke there would be a space or chamber formed below the clay and the dies. This chamber would be filled with air, and on each return stroke of the dies this air would be more or less of it forced into the clay, in consequence of the difference of the area of the small aperture between the die and molds, and the larger area of this surface of the die plus its velocity.

Another advantage is this: it avoids the great friction that would have to be overcome in raising the bricks to the surface of the molds by sliding up an inclined plane on its next quarter movement; or, if not raised to the surface by this means, the same object would have to be obtained by means of an increased leverage of the cam X, or by an equivalent substitute.

In sectional view, Fig. 3, $b''$ represents the cross-section of a horizontal sliding sectional track, guided in its movements by its ends resting in two horizontal grooves within the two uprights P P. The track derives its movement automatically from the cam-roll $x'$ and spiral spring $c'$ through the lever $b$. This lever turns around a fulcrum within the base A, while its other end is attached to the movable track-section.

The spring $c'$ forces the lever $b'$ against the cam-roll, and yields to the pressure of the cam-roll as the increasing part of the cam forces itself between the lever $b'$ and the central axial line around which it revolves.

When the first blow is given to the clay within the molds the anvil rests upon that part of the circumference of the cam which is nearest to the central axial line, and all the blows are repeated. The distance between the center and the anvil increases until the highest point is attained. Now, at this point the size of the cam has decreased so as to allow the sectional track $b''$ to move forward, so that the rabbet $r'$ will project under the pins $r$ within the stems $o$ $o$ $o$, thus supporting the stems and followers while the anvils descend, and holding them in that position until the next quarter movement of the mold-table removes them to the compression-track beyond. The friction-roller $u'$ on the end of the downward-projecting mold and die-adjusting post $u''$ descends with the piston and die-head after the last blow is given, and rests upon the mold-table, the track serving as a friction roll during a quarter movement of the mold-table. During this interval of time the faces of the dies are cleaned and lubricated, this operation being performed by a horizontally-moving bar, K'', which may be covered with cloth or other equivalent substances, which may be kept saturated with oil, or by its equivalent. This bar is supported at each end, and moving back and forth in the guide-groove $p''$ $p''$, said groove being within the frame P P. Movement is given to this bar by the horizontally-reciprocating rod $v'$ $v'$, one end of this rod terminating within the socket $t$, said socket being on the under side and midway of the bar. At the termination of the backward movement of this bar the journal-box $h''$ is located and secured to the platform H. Through this box $h''$ the rod $v'$ reciprocates, and as the movement of the rod is greater than that of the bar $k''$ a special provision is adopted in order to arrest its motion. A hole is drilled through the rod $v'$ $v'$ near its end. Within this hole the bent rod or wire terminates, with its other end rigidly fixed in the bar K''. The under side of the bent rod or wire forms an inverted inclined plane, which corresponds to an inclined plane on the box $h''$. In the backward movement the two planes are brought together, thereby raising the end of the wire out of the hole in the rod $v'$ $v'$, thus disengaging the two connecting parts and arresting the motion of the bar K, which remains at rest until the return of the rod $v$, when the rod and wire again unite and complete the forward movement, thereby again cleaning the surface of the molds, the above-described operation being performed at every quarter-turn of the mold-table. The brick-removing device is operated by the rod $v'$, which extends across the top of the platform and centrally over the mold-table. This rod is supported and guided by the box $s''$, which is secured to the platform H, as shown in Figs 3 and 5.

The end of the rod extends into and through the hub or block $t''$. There are two horizontally-swinging wings, $m\ m'$, hinged to the hub or block, and held to their position, as shown in Fig. 5, during their outward movement. During this movement the bricks are removed from the followers. One of the wings should be made stationary with the hub or block, while the one nearest to the brick that are being raised from the mold by the inclined track should be made to swing backward in time to clear the first brick which presents itself. This secondary movement is effected by means of the rod $m''$, which is attached to the center of the wing $m$ and the slotted connecting-bar $t'$. This swinging movement is a continuation of the backward movement. After the hub and opposite wing have been brought to rest by the withdrawal of the inclined-plane pin S' from the hole $k''$ in the rod $v'$, which is done by the conjunction of the two inclined planes S' S''. This compound movement is repeated at every fourth movement of the mold-table. This movement is also communicated through the crank-pin between the two disks W W'', which work in the slotted bar $t'$, to which the two rods $v'\ v'$ are connected. All of the wearing parts upon which the follower-stems traverse may be faced with steel, and secured to the track in such a manner that they may be easily removed after wearing out, and replaced by others. The section of track beyond the inclined track A' should be made adjustable, and compensate for the wear of the track. By this adjustment the spaces of the followers may be brought to the surface of the mold-table, thereby providing a plane and even surface for the brick to slide off from. The device under the hopper can be changed upon the opposite side of the stems, and worked by a cam and lever near the center of the base of the machine.

What I claim, and desire to secure by Letters Patent, is—

1. The combination of the segmental disks $q\ q'$ on the vertical shaft L with the segmental concave stops $q''\ q'''$ in mold-table B B', substantially as specified.

2. The two curved plates $h$ and $m^2$, posts $b^4$, pin $x^2$, and cam-wheel R, in combination with the follower-posts and revolving mold-table, all operating substantially as set forth.

3. The supporting-plate $b''$, lever $b'$, and spring $c'$, in combination with the cam $x'$ and $x''$, pins $r$, and follower-stems $o\ o\ o$, all working automatically, as herein set forth.

4. The cam-roll X, main driving-shaft I, repressure-track $y\ y$, stems $o\ o\ o$, follower and re-pressure-plate H H', in combination with a revolving mold-table, B B', substantially as described, and for the purpose herein set forth.

5. The combination of the bar K'' and its connections $h'\ h''\ v'\ v'$ with the dies $d''\ d''$, for the purpose herein specified.

6. The combination of the intermittent cog-wheel 5, with the wheel 6, 9, 10, and 11, and the reciprocating hopper F, all operating substantially as specified.

7. The friction-roll-adjusting stop, in combination with the steam die-head K', and the revolving mold-table B B', substantially as described and set forth.

8. The combination of the step J and standards K K with the mold-table and vertical shaft N, as arranged and described.

9. The segmental cam-disk $w\ w$, with its concentric grooves $x^2\ x^2$, cam-teeth therein, the T-groove within their bases, the bolts and nuts for fastening the teeth to the disk, in combination with the vertical rods $w'\ w'$ and the connecting valve-levers, all operating substantially as herein described.

10. The combination of the main driving-shaft, vertical shaft N, disks $w\ w$, and the brick-removing device, all working in combination as described.

ANDREW J. HOYT.

Witnesses:
G. H. EVANS,
R. D. O. SMITH.